Patented Nov. 10, 1942

2,301,257

UNITED STATES PATENT OFFICE 2,301,257

CATALYST FOR THE CONVERSION OF HYDROCARBON OILS

Gerald C. Connolly, Baton Rouge, La., assignor to Standard Oil Development Company, a corporation of Delaware No Drawing. Application July 25, 1940, Serial No. 347,490

4 Claims. (Cl. 196—52)

This invention relates to a catalyst for the conversion of hydrocarbon oils and pertains more particularly to the catalyst for cracking such oils.

The object of the present invention is to provide an improved catalyst for cracking oils.

I have found that the activity of cracking catalysts containing silica and particularly catalysts containing silica and alumina or silica and magnesia may be materially improved by the presence of a small amount of bismuth oxide.

The presence of bismuth oxide has been found to be a particular advantage for increasing the activity of synthetic gels comprising silica and alumina. These gels in themselves without the addition of bismuth oxide have been found to have a relatively high activity for cracking hydrocarbon oils when prepared in the proper manner. One particularly effective method of preparing an active silica-alumina gel is to combine the alumina with the silica while the latter is in a hydrous state, such as in the form of a wet gelatinous precipitate, hydrosol or hydrogel, or mixtures thereof. The method of preparing active silica-alumina gel catalysts for cracking of hydrocarbon oils is described in more particular detail in my copending application, Serial No. 233,159, filed October 4, 1938.

The present invention consists in incorporating into the cracking catalyst and particularly into the silica-alumina gel catalyst of the above type a small amount consisting of not more than 1% of bismuth oxide. This may be accomplished in various ways. One particularly desirable way of incorporating the bismuth oxide into the gel is to impregnate the gel, preferably while in a hydrous state, with a solution containing a decomposable salt of bismuth which may be converted either by heat or by chemical means into bismuth oxide. As an alternative, the silica hydrogel may be impregnated with a mixed solution containing the decomposable salts of aluminum and bismuth of desired concentration. For example, silica hydrogel may be impregnated with a solution containing both aluminum nitrate and bismuth nitrate in proper proportions. To illustrate the advantage of the invention, the following examples are submitted, it being understood that they are illustrative rather than limitative.

In each of the examples given, the activity of the catalyst was determined by the amount of conversion into unstable gasoline formed by passing an East Texas gas oil of 33.8° A. P. I. gravity in contact with the catalyst at a temperature of 850° F., at a rate of 0.6 volume of liquid oil per volume of catalyst per hour for two-hour periods.

*Example 1*

A washed silica hydrogel was soaked with a solution of aluminum nitrate of a concentration such as to produce a catalyst containing about 12.5% alumina until thoroughly saturated. The resulting product was then drained and slowly dried at a temperature of 212° F. The dried product was then slowly heated to 850° F. to decompose the aluminum and to activate the catalyst. This product when tested under the above conditions resulted in a conversion of 50.5%.

*Example 2*

The washed silica hydrogel as in Example 1 was soaked in a solution containing a mixture of aluminum nitrate and bismuth nitrate of such relative concentration as to form a catalyst containing about 12.5% aluminum oxide and about 0.1% of bismuth oxide. This product was then drained, dried, and activated as described in Example 1. The resulting product when tested under the above conditions produced 55% of gasoline.

*Example 3*

A catalyst was prepared as described in Example 2 except that the amount of bismuth nitrate in the solution was increased to produce a catalyst containing about 1.5% of bismuth oxide. This product under test conditions resulted in a conversion of 48.5%.

From the above results it will be observed that the presence of 0.1% of bismuth oxide raised the conversion 5%, whereas when 1.5% of bismuth oxide was present in the catalyst the activity thereof was less than that of the catalyst which did not contain bismuth oxide.

The above catalyst may be employed either in powdered, granular, or molded form. In the above examples, the catalyst was used in the form of pellets.

Having described the preferred embodiment of the invention, it will be understood that it embraces such other variations and modifications as come within the spirit and scope thereof.

What is desired to be protected by Letters Patent is:

1. A catalyst for cracking hydrocarbon oils compprising a synthetic gel containing silica, an active cracking agent, and a substantial amount but not more than 1% of bismuth oxide.

2. A catalyst for cracking hydrocarbon oils comprising a synthetic gel of silica and alumina and containing a substantial amount but not more than 1% of bismuth oxide.

3. A method of cracking hydrocarbon oils which comprises passing the oil to be cracked in contact with a siliceous cracking catalyst containing a substantial amount but not more than 1% of bismuth oxide.

4. A method of cracking hydrocarbon oil which comprises passing the oil to be cracked while at cracking temperature in contact with a catalyst comprising a synthetic gel consisting of silica and alumina and a substantial amount but not more than 1% of bismuth oxide.

GERALD C. CONNOLLY.